(No Model.) 2 Sheets—Sheet 1.
A. SCARLETT.
EDUCATIONAL APPLIANCE.
No. 412,044. Patented Oct. 1, 1889.
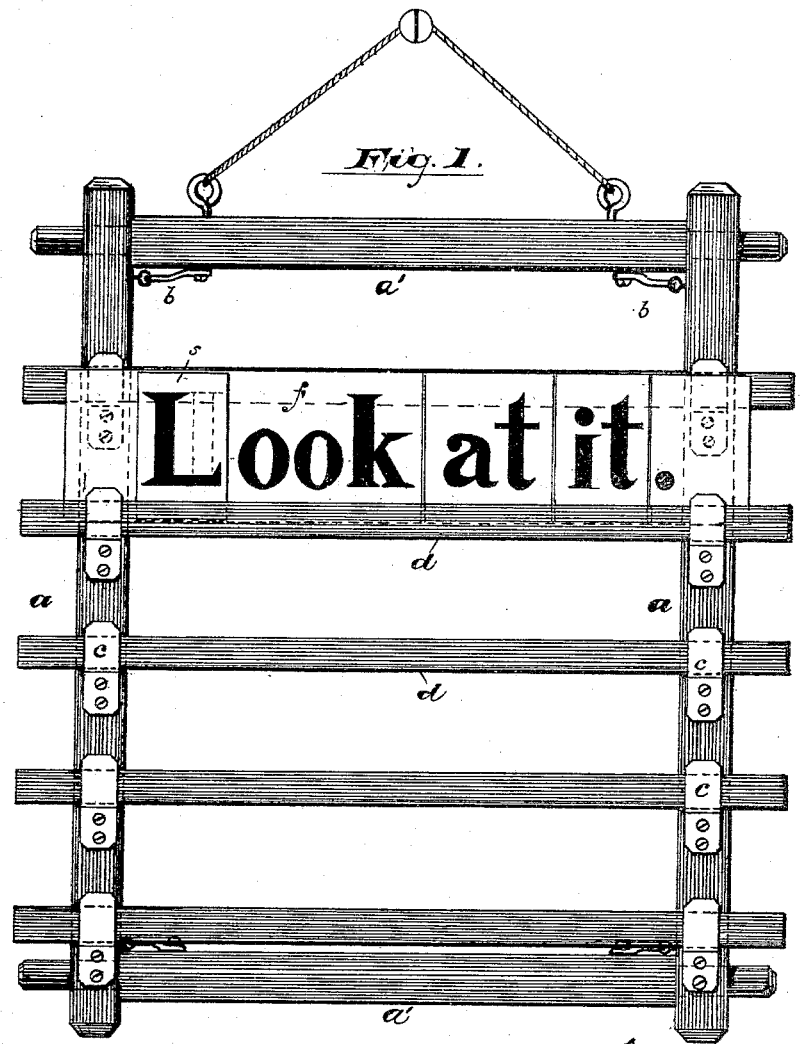
Fig. 2.
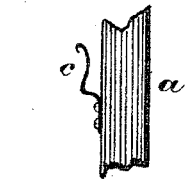
Fig. 3.
WITNESSES: Wm. S. Corwin, M.E.
Jos. C. Farr.
INVENTOR: Augustus Scarlett,
BY Drake & Co., ATT'YS.

(No Model.) 2 Sheets—Sheet 2.
A. SCARLETT.
EDUCATIONAL APPLIANCE.
No. 412,044. Patented Oct. 1, 1889.
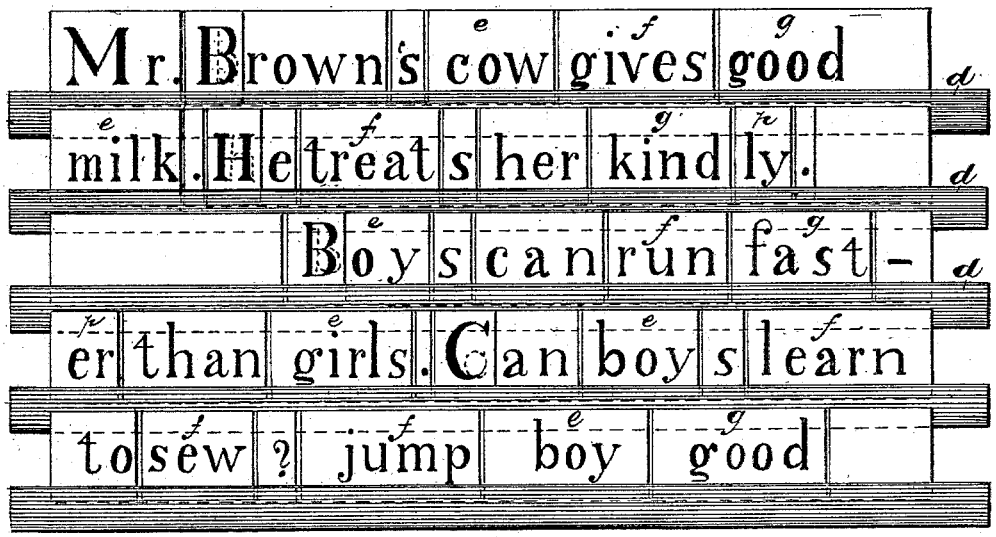
WITNESSES: Wm. S. Corwin, M.C.
Jos. C. Farr
INVENTOR: Augustus Scarlett,
BY Drake & Co. ATT'YS.

UNITED STATES PATENT OFFICE.

AUGUSTUS SCARLETT, OF NEWARK, NEW JERSEY.

EDUCATIONAL APPLIANCE.

SPECIFICATION forming part of Letters Patent No. 412,044, dated October 1, 1889.

Application filed August 20, 1886. Serial No. 211,364. (No model.)

*To all whom it may concern:*

Be it known that I, AUGUSTUS SCARLETT, a citizen of the United States, residing at Newark, in the county of Essex and State of New Jersey, have invented certain new and useful Improvements in Reading and Composing Charts for Educational Purposes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in charts for use in teaching infants or primary scholars; and it consists in the improved reading and composing chart for educational purposes, substantially as will be hereinafter set forth, and finally embodied in the clauses of the claim.

Experience shows that in the employment of primers now in general use and of the ordinary charts used in connection with them the reading lessons are very soon committed to memory by the children and are thus rendered comparatively useless in a reading exercise, because they are repeated without a proper recognition of the words. As a consequence, instead of the recitation being a reading exercise it is rather a narration from memory. Indeed, some children commit the lesson to memory by hearing others repeat it a few times, and are able to recite it without looking at the book or chart, so that it is thus possible for a child of good abilities to spend a long time in the lowest class and not acquire the ability to call a dozen words at sight.
In order to obviate this tendency teachers have required pupils to call single words as pointed out to them on the chart, to read the lines and sentences in promiscuous order, and to call the words in reverse order.
The object of this invention is to avoid this tendency and to provide convenient and effective means whereby the teacher can draw the attention of the child to the word to be committed to memory irrespective of its position in a sentence or its relation to contiguous words, can quickly change the relation of the word with others in a given series, or bring it into combination with other series of words, and can enable the child to build up a sentence from a collection of words by selection.

Referring to the accompanying drawings, in which like letters indicate corresponding parts in each of the figures, Figure 1, Sheet 1, is a front elevation of a rack or frame having thereon certain word-cards which, together with said frame, form a complete reading and composing chart. Fig. 2 is an end view of a removable and separable cardholder adapted to be arranged on said frame. Fig. 3 is a detail view showing a portion of the frame and a spring clip or bracket adapted to receive and support the end of the said card-holder. Figs. 4, 5, 6, 7, and 8, Sheet 2, illustrates certain of the several peculiar kinds of cards which are employed in the improved chart.

In said drawings, $a$ $a'$ are respectively side and cross sections or pieces of a frame or rack, which are preferably provided with means—such as hooks and eyes $b$ $b$—whereby said parts may be readily separated for packing by the teacher cr scholar after the lesson, or when being made ready for the market. Upon said sections are formed or secured brackets or supports $c$, consisting, preferably, of spring-metal hooks or clips, which are preferably disposed in vertical series on the face of the side sections to receive and support the opposite ends of the card-holders $d$. Said card-holders $d$ are preferably strips of wood or metal separable from the frame and grooved at the upper edges, being thus adapted to receive the word-cards and hold them upright or in a vertical position, that they may properly display the words on the face of the cards to the class.

The cards or tablets employed in connection with the card-holders are preferably of paper-board, and are only of sufficient thickness to secure adequate strength and durability. They are of sufficient width to overlap and conceal, or nearly conceal, the holder in the series next above the one to which the card is secured, so that the chart when filled will present to the class a uniform surface. The overlapping of the card over the holder by the projection of the latter causes the card to be held firmly in place, while at the same time the edge of the card is free, so that the said card may be readily withdrawn from the holder without preliminary manipulation.

The cards employed are of various kinds, the majority or bulk of them having complete words of inseparable letters printed thereon, so that wherever an individual card is found it will be known to represent a distinct idea or thing, it thus being distinguished from the ordinary series of separable blocks having an individual letter on each, such as are commonly employed by children as playthings. Said word-cards are of various kinds, having distinct effects when in use, and are illustrated more fully on Sheet 2 of the drawings, in which $e$ is a name-word card or a card having imprinted thereon a plurality of inseparable letters indicative or declarative of an object or thing. These said letters are in large type or characters, so that the scholar can clearly see and examine the letters from the more distant points of the class-room, and thus become familiar with the word as such without particular reference to the individual letters which compose it or the aggregation of sounds which said letters represent.

$f f$ are action or predicating word cards, having thereon action or predicating words, such as will represent the actions occurring in child-life, as "run," "play," "sing," "study," "sew," &c.

$g g$ are qualifying-word cards, the same having printed thereon adjectives, adverbs, or other qualifying words—such as "good," "bad," "up," "down," "slow," "quickly," &c.

The words on the different word-cards $e$, $f$, and $g$ consist of a plurality of letters printed together in an inseparable relation, so that the word wherever found will, after once being committed to memory, be immediately recognized and its value or meaning in the sentence understood.

In addition to having selected series of name, action, or predicating and qualifying word cards, which comprise the bulk of the cards employed in the chart, I prefer to use in connection therewith cards having thereon other parts of speech, such as conjunctions, prepositions, and also termination, syllable, or affix cards $p$, for use in connection with primitive-word cards—such as "ing," "er," "en," "ly," "'s"—for changing or varying the meaning or value of the said primitive or simple words, making them derivative or compound words. I may employ, also, expression-cards $r$, as illustrated in Fig. 5, having thereon such idiomatic expressions as "it is," "there is," "here is," &c. I may also employ in connection with the word-cards letter-cards $s$, as indicated in Fig. 7, for changing the value of said word-cards by placing the said letter-card in front of the word-card to cover or conceal a part thereof. These letter-cards may, after the child has learned a word as a whole, be employed by the child in a spelling exercise; but this feature does not embrace, broadly, my invention.

The invention also comprehends the employment of punctuation-cards $t$, for use with sentences built up with or by the use of the word-cards. These are exemplified in Fig. 8.

By having each word printed on a separate tablet or piece of paper or card-board, as herein provided for, a change in the order of words or the substitution of one word for another can be quickly made, and the ability of the pupil to call the word from his own knowledge satisfactorily tested. Additional sentences or phrases may be readily formed and the word be read or used in a variety of situations requiring different modes of expression. The words learned by the children may be easily reviewed in a new order and in different relations to other words. The pupil is enabled to put his own spoken sentences in proper form in printed words, using capitals and punctuation-marks as needed. Sentences being thus constructed under the observation of the class and subject to their criticism will naturally make a stronger impression than if the same sentences were written on the blackboard by the teacher, because the capitals and points would be selected and placed in position by the children themselves.

I am aware that in teaching-charts heretofore in use alphabet cards and blocks removable from their holding-frame have been employed in formulating words and sentences, and, furthermore, that in certain train-indicators words have been printed on removable cards or slips, and therefore I do not claim, broadly, herein the mere use of letter-cards and word-cards for advertising and educational purposes.

In my improvements the word-cards are found with a series of inseparable letters forming words, the letters of which cannot be dispersed, so that every time the card is handled the word will be found complete and recognizable, and will thus be sooner learned than if the letters were scattered after being disconnected from the chart. It is true that word-cards and phrase-cards have been used in advertising media, as above indicated; but in the improved device I combine nouns formed of inseparable letters with separate verbs or predicating words, which are similarly formed to enable the scholar to formulate a sentence without manipulating individual letters to reverse the positions of the subject or noun and predicate or verb of the said sentence, or to substitute other nouns or verbs without suffering the inconvenience of handling individual letter blocks or cards.

The construction of the frame and removable card-holders enable the scholar to formulate on said holder a sentence away from the chart or frame. Thus the child may or a number of children at one time may select his or their words and place them in the holder in a sentence series at the teacher's table and subsequently adjust them, by means of the clips on the outer face of the frame, on said frame to be criticised by the teacher or studied by the other scholars, the cards remaining while being transported from place to place in a straight series on a firm support. As the cards are held at but one edge in the holder, the middle cards may be removed and others substituted while the child is, with the teacher, away from the frame, without disturbing the end cards of the series. Thus the inconvenience of having the cards caught at both the upper and lower edges by the holder in the act of adjustment is avoided, and the center cards may be inserted into the slit of the holder or be removed therefrom at pleasure. Again, the peculiar construction of the frame and card-holding strips is such as that they may all be detached from one another and be closely packed away, so as to be longitudinally together in one comparatively small receptacle, while the cards are packed in another suited to their construction. Said card-holding strips, being preferably of wood or metal, are rigid, and thus will not sag or vibrate when supporting the cards, as would cords stretched from side to side of the frame. Said strips present an inflexible and firm bearing for the card, so that when the latter is inserted or removed the same may be accomplished more readily and without disturbing the other cards of the series. By providing rigid strips the series of word-cards may be transported from place to place, free of the frame, without danger of disarrangement, or be secured in and removed from the clips readily and together without the need of employing but one hand. By securing the spring-clips on the front faces of the upright sections of the frame so that they extend upwardly and away therefrom, the said clips are adapted to bear by spring-power on the outer face of the rigid card-holding strips, holding the said strips against said uprights, but allowing them to be readily removed or detached from the frame by a simple upward pressure, without any danger of disturbing the arrangement of the cards therein.

What I claim is—

1. The improved educational chart herein described, combining with a frame or backing provided with brackets or supports $c$ strips $d$, separable from said brackets and grooved in their upper edges, and word-cards, said parts being arranged and combined substantially as and for the purposes set forth.

2. The improved educational chart herein described, combining therein a frame or backing having clips at the sides thereof, a series of grooved strips adapted to be separably or removably held in said clips at the ends thereof, and cards having words printed thereon, substantially as set forth.

3. The improved educational chart herein described, combining therein a frame or backing composed of sections or pieces separable from one another, the side sections being provided with brackets or supports for separable strips, said strips having grooves for word-cards, and said word-cards, said parts being arranged and combined substantially as and for the purposes set forth.

4. In combination, in an educational chart, a frame provided with spring-clips, rigid and grooved strips separable from the frame, and word-cards, substantially as set forth.

5. In combination, a rack of separable sections having series of spring-clips or brackets secured at the sides thereof, a series of separable card-holders, and a series of interchangeable word-cards, all arranged and combined substantially as and for the purposes set forth.

In testimony that I claim the foregoing I have hereunto set my hand this 12th day of August, 1886.

AUGUSTUS SCARLETT.

Witnesses:
CHARLES H. PELL,
OSCAR A. MICHEL.